United States Patent [19]
Kanekiyo et al.

[11] Patent Number: 5,799,018
[45] Date of Patent: Aug. 25, 1998

[54] METHOD AND SYSTEM FOR PRIVATE COMMUNICATION WITH EFFICIENT USE OF BUS TYPE TRANSMISSION PATH

[75] Inventors: Tomoyuki Kanekiyo; Haruhiko Kojima; Hiroyuki Nishi, all of Kanagawaken, Japan

[73] Assignee: Nippon Telegraph and Telephone Corp., Tokyo, Japan

[21] Appl. No.: 445,180

[22] Filed: May 19, 1995

[30] Foreign Application Priority Data

May 19, 1994 [JP] Japan ................. 6-105114

[51] Int. Cl.⁶ ........................................ H04J 3/16
[52] U.S. Cl. ................. 370/451; 370/459; 370/461; 340/825.08
[58] Field of Search ............... 370/85.1–85.8, 370/85.12, 79, 82, 105.1, 95.1, 95.3, 95.2, 85.2, 85.3, 85.4, 351, 389, 395, 445, 443, 447, 449–451, 458, 459, 461, 462, 463, 498, 522, 528; 340/825.02, 825.03, 825.05, 825.07, 825.08

[56] References Cited

U.S. PATENT DOCUMENTS

| | | | |
|---|---|---|---|
| 3,851,104 | 11/1974 | Willard et al. | |
| 4,656,627 | 4/1987 | Hasley et al. | 370/85.11 |
| 4,763,320 | 8/1988 | Rudolph et al. | 370/449 |
| 4,811,336 | 3/1989 | Backhaus et al. | 370/85.12 |
| 4,872,003 | 10/1989 | Yoshida | 370/95.2 |
| 4,949,395 | 8/1990 | Rydbeck | 370/95.3 |
| 5,014,269 | 5/1991 | Picandet | 370/85.11 |
| 5,090,013 | 2/1992 | Fadem | 370/449 |
| 5,124,981 | 6/1992 | Golding | 370/440 |
| 5,132,680 | 7/1992 | Tezuka et al. | 370/85.8 |
| 5,161,154 | 11/1992 | Diaz et al. | 370/95.1 |
| 5,185,737 | 2/1993 | Nessehi et al. | 370/85.8 |
| 5,303,234 | 4/1994 | Kou | 370/95.3 |
| 5,307,348 | 4/1994 | Buchholz et al. | 370/95.3 |
| 5,329,530 | 7/1994 | Kojima | 370/95.3 |
| 5,331,316 | 7/1994 | Mestdagh et al. | 370/85.6 |
| 5,392,276 | 2/1995 | Tran | 370/85.3 |
| 5,422,880 | 6/1995 | Heitkamp et al. | 370/449 |
| 5,446,739 | 8/1995 | Nakano et al. | 370/95.3 |
| 5,452,330 | 8/1995 | Goldstein | 370/85.11 |
| 5,455,964 | 10/1995 | Ross et al. | 455/34.2 |
| 5,471,645 | 11/1995 | Felix | 455/62 |
| 5,495,483 | 2/1996 | Grube et al. | 370/95.1 |
| 5,499,243 | 3/1996 | Hall | 370/85.8 |
| 5,517,502 | 5/1996 | Bestler et al. | 370/449 |
| 5,557,612 | 9/1996 | Bingham | 370/449 |
| 5,570,355 | 10/1996 | Dail et al. | 370/395 |
| 5,570,361 | 10/1996 | Norizuki et al. | 370/392 |

FOREIGN PATENT DOCUMENTS

| | | |
|---|---|---|
| 2-92196 | 3/1990 | Japan |
| 4-220035 | 8/1992 | Japan |
| 5-211517 | 8/1993 | Japan |
| 6-97961 | 4/1994 | Japan |

*Primary Examiner*—Benedict V. Safourek
*Assistant Examiner*—Seema S. Rao
*Attorney, Agent, or Firm*—Banner & Witcoff Ltd

[57] ABSTRACT

A private communication system using bus type transmission path, in which a plurality of communication terminal devices for carrying out communications and a system main device for exchanging communications from the communication terminal devices are connected by upward and downward digital transmission paths for transmitting data in forms of upward and downward transmission frames formed by a plurality of cells in fixed length. The system main device determines an allocation of idle cells in each upward transmission frame to a communication from each communication terminal device according to a communication request made by each communication terminal device, and transmits a notification for the determined allocation to each communication terminal device by using an idle cell among the cells in each downward transmission frame, such that each communication terminal device recognizes allocated cells on the upward digital transmission path available for the communication from each communication terminal device according to the notification transmitted through the downward digital transmission path.

10 Claims, 6 Drawing Sheets

FIG.11B

METHOD AND SYSTEM FOR PRIVATE COMMUNICATION WITH EFFICIENT USE OF BUS TYPE TRANSMISSION PATH

BACKGROUND OF THE INVENTION

1. Field of the Invention

The present invention relates to a private communication system formed by a system main device and a plurality of communication terminal devices connected through digital transmission paths.

2. Description of the Background Art

A private communication system can be roughly classified into two types of a telephone type and a computer-to-computer communication type, where the representative example of the telephone type includes a PBX (Private Branch eXchanger) and a dial telephone device while the representative example of the computer-to-computer communication type includes a LAN (Local Area Network).

On the other hand, the private communication system can also be classified in view of its topology, such as a star, a bus, and a ring. In general, the PBX uses a star wiring, and the dial telephone device uses a star or bus wiring. The LAN has various types using various topologies such as a star, a bus, and a loop, and the representative example of the bus type topology includes the CSMA/CD (Carrier Sense Multiple Access with Collision Detection) scheme standardized by the 802 committee of the IEEE.

Figure 2:
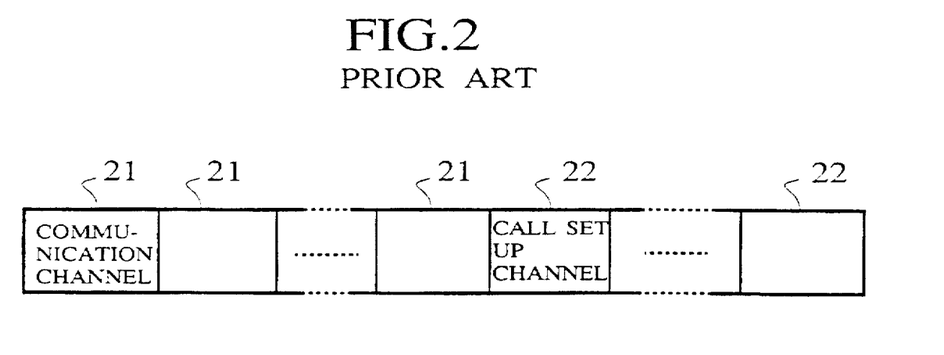
FIG. 2 is a diagrammatic illustration of a channel configuration for a transmission path in a conventional dial telephone device using a bus type topology.

The dial telephone device using the bus type topology has a bus type transmission path in each of upward and downward direction, and as shown in FIG. 2, each transmission path has a communication channel 21 and a call set up channel 22 of a fixed data length, where each call set up channel 22 is fixedly assigned to the respective communication terminal device. Each communication terminal device transmits an allocation request for the communication channel 21 to the system main device through the respective call set up channel 22, such that the system main device determines the allocation of each communication channel 21 according to the request received from each communication terminal device. Then, the system main device transmits the determined allocation to each communication terminal device through the respective call set up channel 22, such that each communication terminal device carries out the communication by using the allocated communication channel 21.

However, in this dial telephone device using the bus type topology, there is a need to provide a call set up channel fixedly assigned to each communication terminal device separately from the communication channel, and there has been a problem that, as a number of communication terminal devices on the bus increases, a bandwidth used by the call set up channels on the transmission path increases and the transmission efficiency is lowered.

On the other hand, in the CSMA/CD scheme, the data transmission is carried out by confirming the absence of the data transmission by the other communication terminal devices on the bus type transmission path. When a collision of the data on the bus occurred after the start of the data transmission, the data transmission is interrupted and then resumed after a certain period of time that has been set up at random, so as to enable the data transmission of each communication terminal device.

However, in this CSMA/CD scheme, only one communication terminal device can carry out the communication at any moment and a collision of data cells on the transmission path occurs when the cells are congested, so that there is a need for a re-transmission procedure for the collided data cells, and therefore it is not suitable for the real time communication.

SUMMARY OF THE INVENTION

It is therefore an object of the present invention to provide a method and a system for a private communication using bus type transmission path, capable of preventing the re-transmission due to the collision of the communication cells so as to enable the real time communication at each communication terminal device.

It is another object of the present invention to provide a method and a system for a private communication using bus type transmission path, capable of enabling the communication at the communication rate requested by each communication terminal device by sharing the transmission path efficiently.

According to one aspect of the present invention there is provided a private communication system, comprising: a plurality of communication terminal devices for carrying out communications; a system main device for exchanging communications from the communication terminal devices; upward and downward digital transmission paths, connecting the system main device and each of the communication terminal devices, for transmitting data in forms of upward and downward transmission frames formed by a plurality of cells in fixed length; wherein the system main device includes: means for determining an allocation of idle cells in each upward transmission frame to a communication from each communication terminal device according to a communication request made by said each communication terminal device; and means for transmitting a notification for the allocation determined by the determining means to said each communication terminal device by using an idle cell among the cells in each downward transmission frame, such that said each communication terminal device recognizes allocated cells on the upward digital transmission path available for the communication from said each communication terminal device according to the notification transmitted through the downward digital transmission path.

According to another aspect of the present invention there is provided a method of private communication in a private communication system formed by a plurality of communication terminal devices for carrying out communications and a system main device for exchanging communications from the communication terminal devices, the method comprising the steps of: connecting the system main device and each of the communication terminal devices by upward and downward digital transmission paths for transmitting data in forms of upward and downward transmission frames formed by a plurality of cells in fixed length; determining an allocation of idle cells in each upward transmission frame to a communication from each communication terminal device at the system main device, according to a communication request made by said each communication terminal device; and transmitting a notification for the allocation determined at the determining step from the system main device to said each communication terminal device by using an idle cell among the cells in each downward transmission frame, such that said each communication terminal device recognizes allocated cells on the upward digital transmission path available for the communication from said each communication terminal device according to the notification transmitted through the downward digital transmission path.

Other features and advantages of the present invention will become apparent from the following description taken in conjunction with the accompanying drawings.

DETAILED DESCRIPTION OF THE PREFERRED EMBODIMENTS

Figure 1:
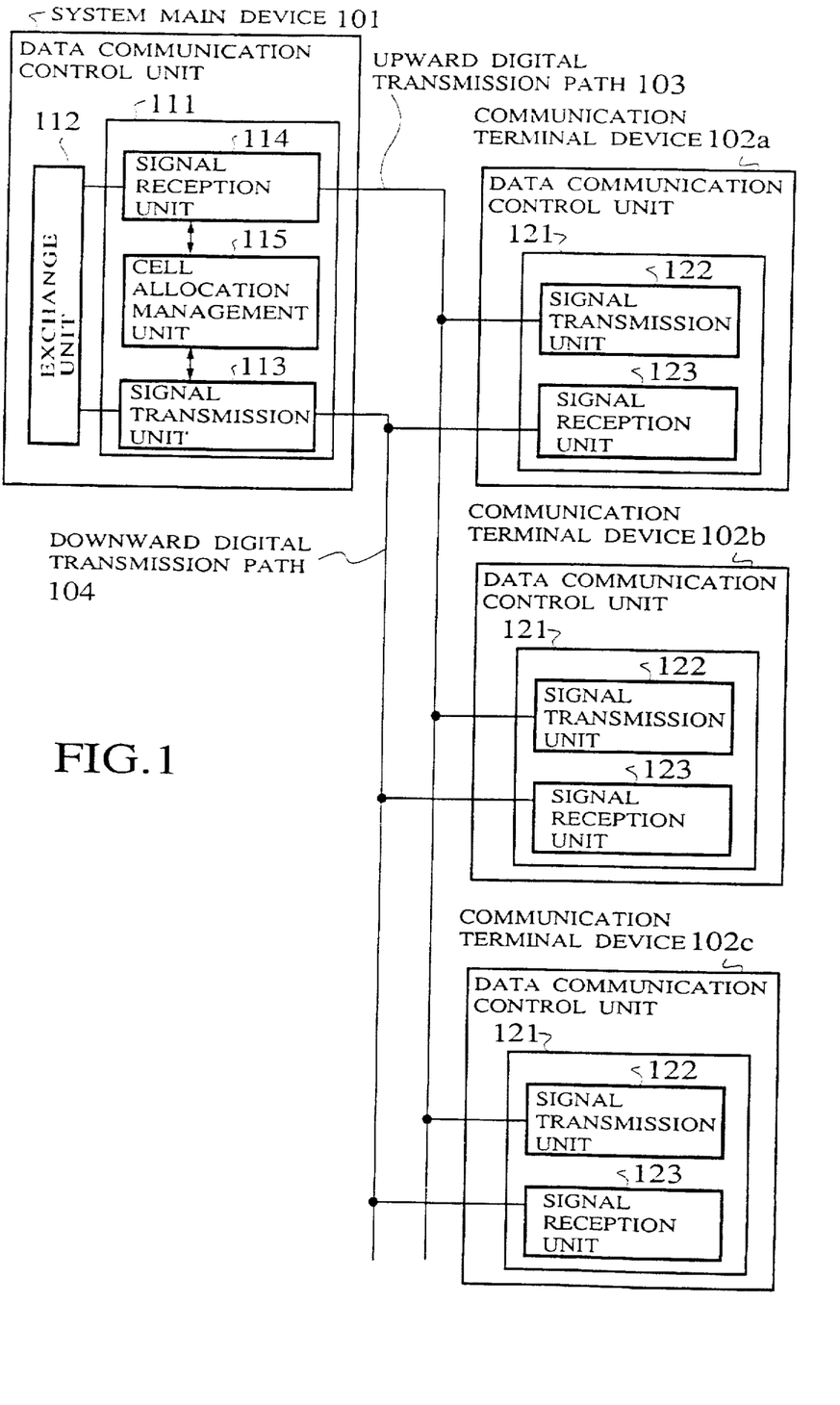
FIG. 1 is a schematic block diagram of one embodiment of a private communication system according to the present invention.

Referring now to FIG. 1, one embodiment of a private communication system according to the present invention will be described in detail.

In this embodiment, the private communication system has a schematic configuration as shown in FIG. 1, which generally comprises a system main device 101 and a plurality of communication terminal devices 102a to 102c, where the system main device 101 and each of the communication terminal devices 102a to 102c are connected through a bus type transmission path containing an upstream digital transmission path 103 and a downward digital transmission path 104.

The upward digital transmission path 103 and the downward digital transmission path 104 transmit upward and downward transmission frames formed by a plurality of cells in fixed length, respectively. The cells of the upward transmission frame transmitted through the upward digital transmission path 103 are utilized by the communication terminal devices 102a to 102c in transmitting data from each of the communication terminal devices 102a to 102c to the system main device 101. Here, a right for using cells is given to each of the communication terminal devices 102a to 102c by the system main device 101. The cells of the downward transmission frame transmitted through the downward digital transmission path 104 are utilized by the system main device 101 in transmitting data from the system main device 101 to each of the communication terminal devices 102a to 102c.

The system main device 101 is mainly formed by a CPU which comprises a data communication control unit 111 and an exchange unit 112. The data communication control unit 111 includes a signal transmission unit 113 for transmitting cells to the downward digital transmission path 104, a signal reception unit 114 for receiving cells from the upward digital transmission path 103, and a cell allocation management unit 115 for determining an allocation of the cells on the upward and downward digital transmission paths 103 and 104 to each of the communication terminal devices 102a to 102c. The exchange unit 112 is connected with the signal transmission unit 113 and the signal reception unit 114, and carries out an exchange processing of the cells transmitted through the upward and downward digital transmission paths 103 and 104.

On the other hand, each of the communication terminal devices 102a to 102c is mainly formed by a CPU which comprises a data communication control unit 121 having a signal transmission unit 122 for transmitting cells to the upward digital transmission path 103 and a signal reception unit 123 for receiving cells from the downward digital transmission path 104.

Here, it is to be noted that the configuration of each of the communication terminal devices 102a to 102c shown in FIG. 1 is only an exemplary one, and may be modified appropriately according to the need. Also, a number of communication terminal devices to be connected to the upward and downward digital transmission paths 103 and 104 is not necessarily limited to three as shown in FIG. 1, and can be any desired number.

Figure 3:
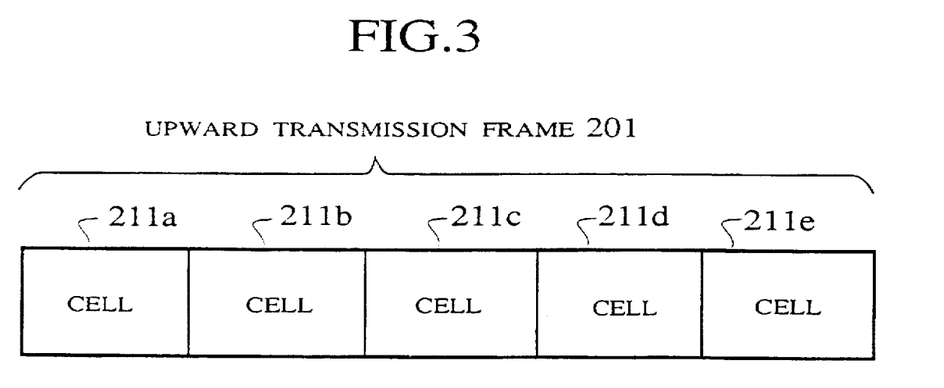
FIG. 3 is a diagrammatic illustration of a frame configuration for an upward digital transmission path in the private communication system of FIG. 1.
Figure 4:
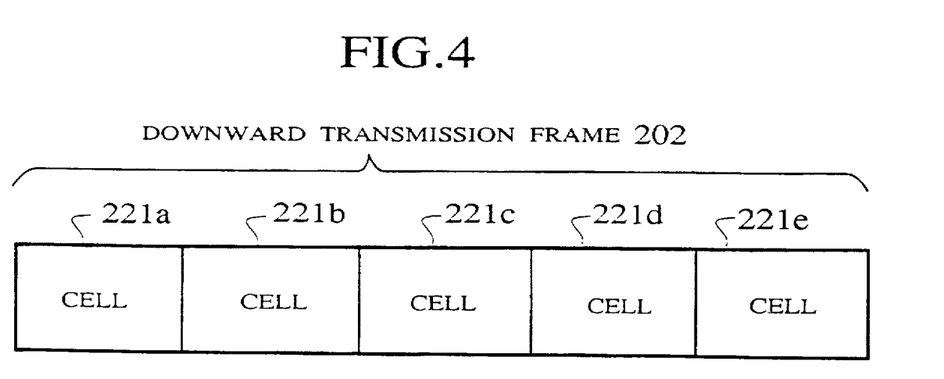
FIG. 4 is a diagrammatic illustration of a frame configuration for a downward digital transmission path in the private communication system of FIG. 1.

As shown in FIGS. 3 and 4, the upward transmission frame 201 to be transmitted through the upward digital transmission path 103 is formed by a plurality of cells 211a to 211e in fixed bit length, and the downward transmission frame 202 to be transmitted through the downward digital transmission path 104 is formed by a plurality of cells 221a to 221e in fixed bit length. Each of the communication terminal devices 102a to 102c carries out the communication by using these cells 211a to 211e and 221a to 221e.

Here, it is to be noted that the frame configuration of the upward and downward transmission frames 201 and 202 shown in FIGS. 3 and 4 is only an exemplary one, and may be modified appropriately according to the need. Also, a number of cells to be provided in each of the upward and downward transmission frames 201 and 202 is not necessarily limited to five as shown in FIGS. 3 and 4, and can be any desired number.

Figure 5:
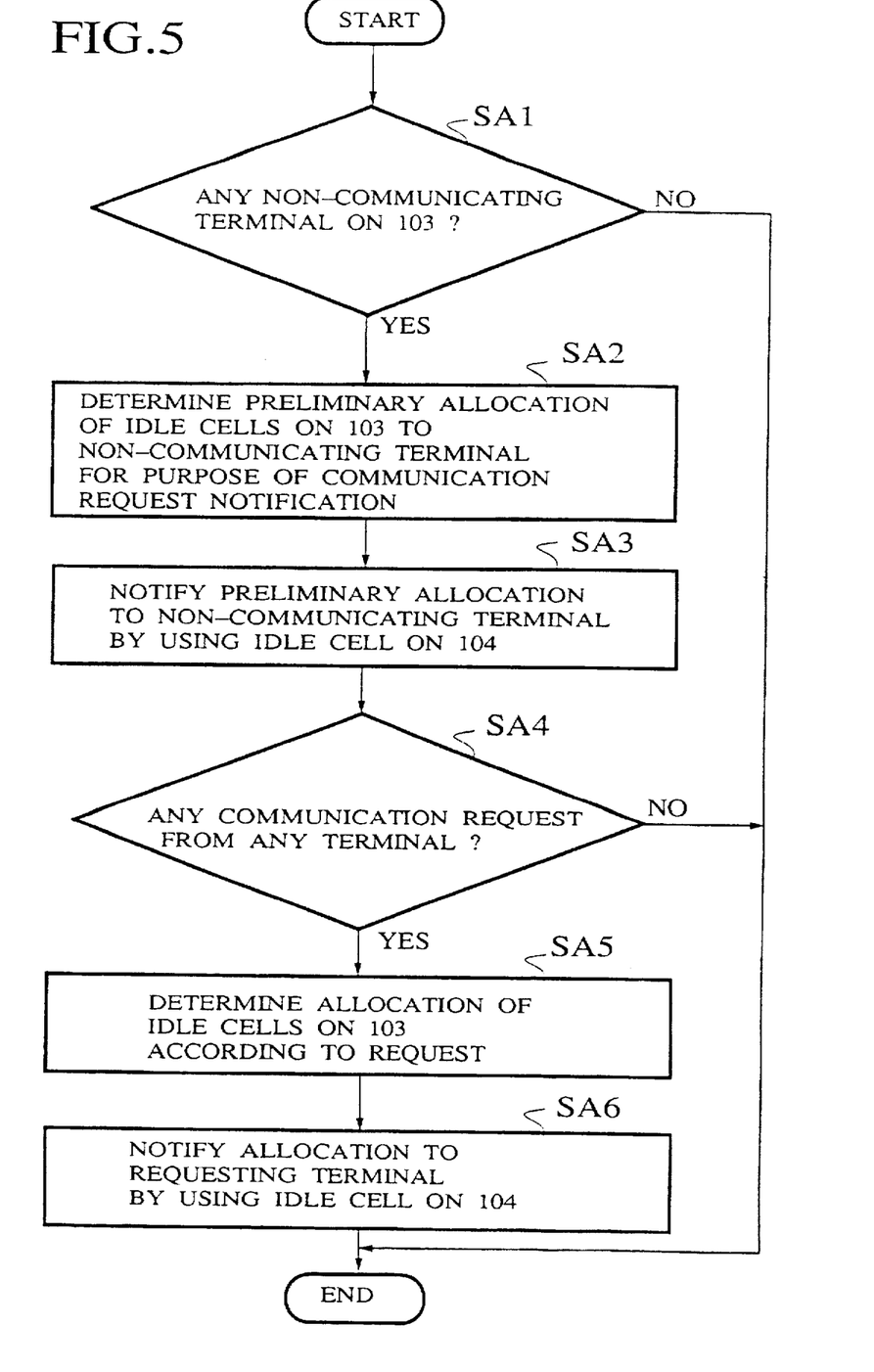
FIG. 5 is a flow chart for an exemplary operation at a system main device in the private communication system of FIG. 1.
Figure 6:
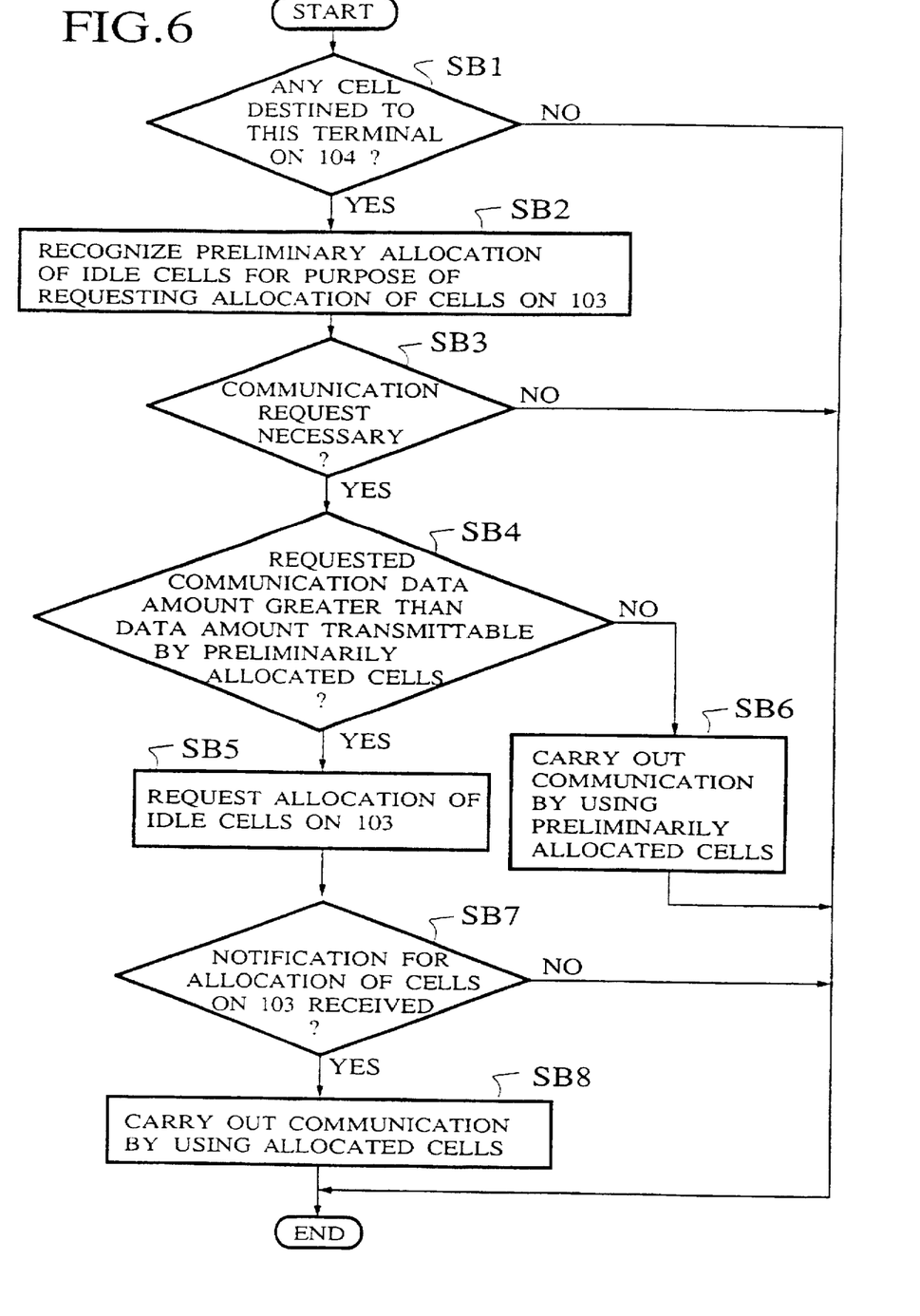
FIG. 6 is a flow chart for an exemplary operation at a communication terminal device in the private communication system of FIG. 1.

Now, an exemplary operation of the private communication system of this embodiment will be described with references to the flow charts of FIGS. 5 and 6, where the flow chart of FIG. 5 shows an operation of the system main device 101 while the flow chart of FIG. 6 shows an operation of one communication terminal device which is assumed to be the communication terminal device 102c.

This exemplary operation concerns with a case in which the communication terminal device 102c starts out the communication by using the upward digital transmission path 103 while the communication terminal devices 102a and 102b are already in communication by using the upward digital transmission path 103. More specifically, in the private communication system shown in FIG. 1 using the upward and downward transmission frames 201 and 202 as shown in FIGS. 3 and 4, the communication terminal device 102a is using a cell 211a on the upward digital transmission path 103, the communication terminal device 102b is using a cell 211b on the upward digital transmission path 103, and cells 221a, 221b and 221c on the downward digital transmission path 104 are used for communication, when the communication terminal device 102c starts out the upward communication with respect to the system main device 101.

First, the system main device 101 judges whether there is any communication terminal device which is currently not in communication by using the cells 211a to 211e on the upward digital transmission path 103 (non-communicating terminal) or not (SA1), and if no such non-communicating terminal exists as a result of this judgment (SA1 NO), the operation is terminated. When the non-communicating terminal such as the communication terminal device 102c according to the above assumption is recognized by the cell allocation management unit 115 (SA1 YES), an idle cell 211c on the upward digital transmission path 103 is preliminarily allocated to this non-communicating terminal 102c by the cell allocation management unit 115, for the purpose of communication request notification from this non-communicating terminal 102c to the system main device 101 (SA2).

Then, the system main device 101 notifies this preliminary allocation of the cell 211c on the upward digital transmission path 103 from the signal transmission unit 113 to the non-communicating terminal 102c by using an idle cell 221d on the downward digital transmission path 104 (SA3).

On the other hand, at the communication terminal device 102c, whether there is any cell which is destined to this terminal on the downward digital transmission path or not is judged (SB1), and if no such cell exists as a result of this judgment (SB1 NO), the operation is terminated. When there exists a cell which is destined to this terminal on the downward digital transmission path 104 such as the cell 221d transmitted from the system main device 101 (SB1 YES), this cell is received by the signal reception unit 123, and the preliminary allocation of the idle cell 211c for the purpose of requesting allocation of cells on the upward digital transmission path 103 at a time of communication which is indicated by this received cell 221d is recognized (SB2).

Then, this non-communicating terminal 102c judges whether it is necessary to make a communication request or not (SB3), and if there is no need to make a communication request (SB3 NO), the operation is terminated. When there is a need to make a communication request (SB3 YES), whether the communication data amount to be requested is greater than the data amount transmittable by the cell preliminarily allocated for the purpose of requesting the allocation of cells or not is judged (SB4). If this is the case (SB4 YES), then the communication terminal device 102c requests the allocation of as many idle cells on the upward digital transmission path 103 as necessary for the required communication rate to the system main device 101 by using the preliminarily allocated cell 211c through the signal transmission unit 122 (SB5), whereas otherwise (SB4 NO), the communication terminal device 102c carries out the communication by using the preliminarily allocated cell 211c (SB6) and the operation is terminated.

Next, the system main device 101 judges whether there is any communication request from any communication terminal device or not (SA4), and is there exists no communication request as a result of this judgment (SA4 NO), the operation is terminated. When there is a communication request such as that transmitted from the communication terminal device 102c by using the cell 211c (SA4 YES), this request for allocation of cells from the communication terminal device 102c is received by the signal reception unit 114, and the allocation of as many idle cells on the upward digital transmission path 103 as requested by this communication request with respect to the requesting communication terminal device 102c (requesting terminal) is determined by the cell allocation management unit 115 at the system main device 101 (SA5).

Then, the system main device 101 notifies this allocation of the cells on the upward digital transmission path 103 from the signal transmission unit 113 to the requesting terminal 102c by using an idle cell 221d on the downward digital transmission path 104 (SA6).

On the other hand, at the communication terminal device 102c, whether a notification for the requested allocation of cells on the upward digital transmission path 103 has been received from the system main device 101 or not is judged (SB7), and if such a cell allocation notice has not been received as a result of this judgment (SB7 NO), the operation is terminated. When such a cell allocation notice has been received (SB7 YES), then the communication terminal device 102c carries out the communication by using the allocated cells on the upward digital transmission path 103 according to the received cell allocation notice (SB8).

It is to be noted here that, according to this embodiment as described above, the operation of the system main device 101 as well as the operation of the communication terminal device 102 are realized as two step processing including a processing for indicating and accepting a communication request (SA1 to SA4 of FIG. 5, SB1 to SB3 of FIG. 6) and a processing for the actual cell allocation (SA5 to SA6 of FIG. 5, SB4 to SB8 of FIG. 6). This provision is adopted such that the communication terminal device 102 can omit the communication request whenever the preliminarily allocated cells are sufficient for making the communication.

As described, according to this embodiment, the system main device 101 transmits the allocation of the cells on the upward digital transmission path 103 to each communication terminal device 102 by using an idle cell not currently in use among the cells on the downward digital transmission path 104, in order to realize the allocation of the upward communication cells. As a result, it is possible to realize the communication at the transmission rate requested by each communication terminal device 102 connected through the upward and downward digital transmission paths 103 and 104 by the bus wiring, as well as in real time. In addition, there is no need for providing fixedly assigned cells dedicated for the purpose of cell allocation on the upward and downward digital transmission paths 103 and 104, so that it is possible to increase the bandwidth available for the communication considerably, compared with the prior art. Also, it is possible for the communication terminal device 102 to utilize a plurality of cells within each frame, so that the transmission bandwidth can be utilized efficiently.

Next, a detailed configuration of a cell used as a cell allocation notification in the embodiment described above will be described.

Figure 7:
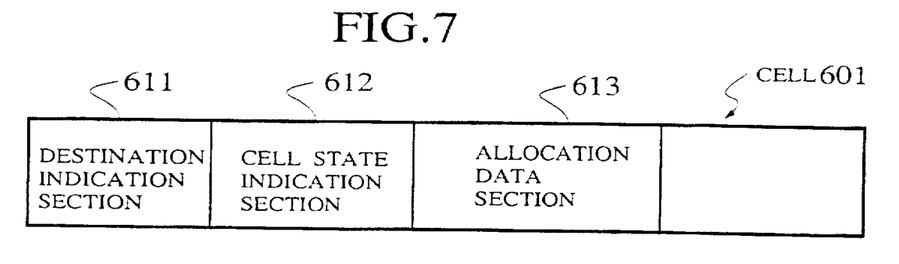
FIG. 7 is a diagrammatic illustration of a cell configuration for a cell allocation notification cell to be used in the private communication system of FIG. 1.

FIG. 7 shows an exemplary configuration of a cell on the downward digital transmission path 104 which is used as a cell allocation notification according to the present invention, where the cell 601 includes a destination indication section 611 for indicating a terminal to which the cell allocation is to be notified, a cell state indication section 612 for indicating that this is a cell for cell allocation notification, and a allocation data section 613 indicating the cell allocation to be notified, while the rest of this cell 601 is filled with dummy data. Here, the destination indication section 611 corresponds to a cell header portion and the other sections correspond to a cell data portion in a usual cell for a communication data transmission.

In this cell 601, the allocation data section 613 can have either one of the following two detailed configuration.

Figure 8:
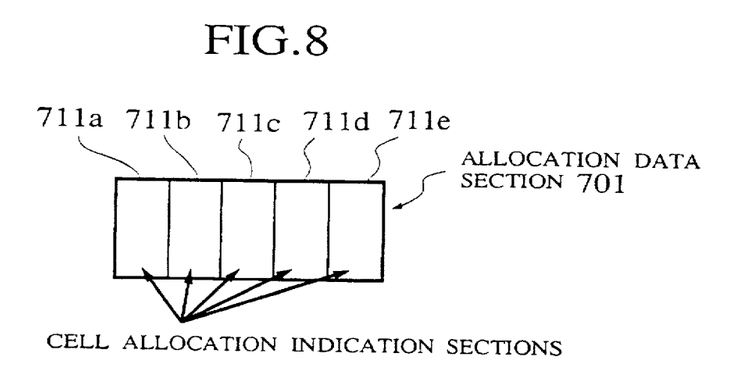
FIG. 8 is a diagrammatic illustration of one possible configuration of an allocation data section in the cell allocation notification cell of FIG. 7.

First, it is possible to use the allocation data section 701 in a bit map indication scheme as shown in FIG. 8, which comprises as many number of cell allocation indication sections 711a to 711e as a number of cells provided in each upward transmission frame 201. Here, each cell allocation indication section 711 has a size of 1 bit, and these cell allocation indication sections 711a to 711e are provided in correspondence to the cells 211a to 211e on the upward digital transmission path 103, such that a bit value of each cell allocation indication section 711 indicates the allocation of the corresponding cell on each upward transmission frame 201.

For example, the cell allocation indication section 711 with a bit value of "1" can indicate a presence of the allocation of the corresponding cell on each upward transmission frame 201, and the cell allocation indication section 711 with a bit value of "0" can indicate an absence of the allocation of the corresponding cell on each upward transmission frame 201. It is to be noted, however, that this assignment of the bit value for the purpose of indicating the cell allocation may be reversed if desired, and a number of these cell allocation indication sections 711a to 711e varies according to the number of cells provided in each upward transmission frame 201 so that it is not necessarily limited to five as shown in FIG. 8.

Figure 9A:
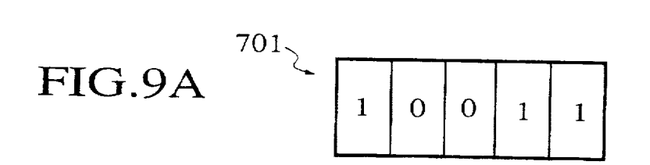
FIGS. 9A and 9B are diagrammatic illustrations of the allocation data section of FIG. 8 and corresponding cells in an upward transmission frame for an exemplary case.
Figure 9B:
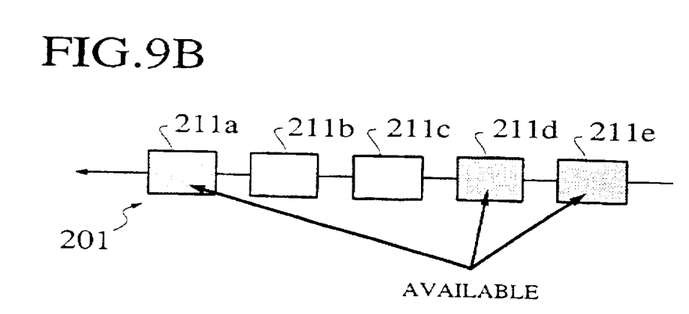

As a concrete example, when the cell allocation indication sections 711a to 711e having bit values of 711a="1", 711b="0", 711c="0", 711d="1", and 711e="1" as shown in FIG. 9A are received, it is indicated that, for this communication terminal device, the cells 211a, 211d, and 211e on each upward transmission frame 201 are available for the communication as shown in FIG. 9B.

Figure 10:
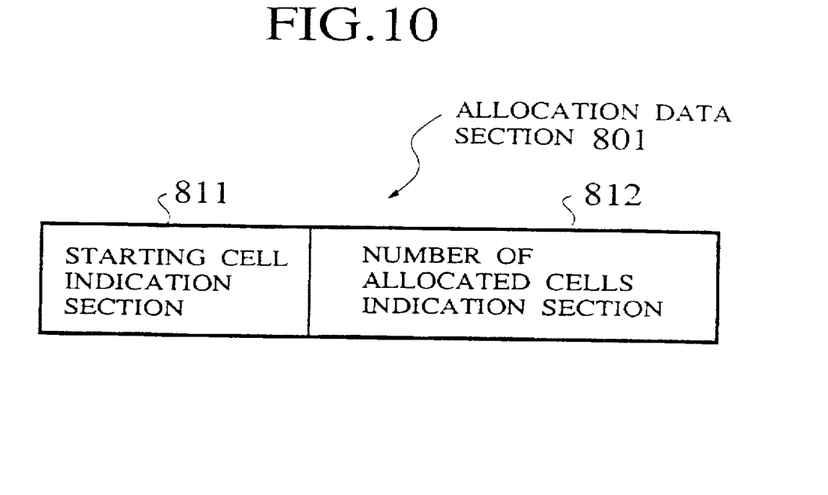
FIG. 10 is a diagrammatic illustration of another possible configuration of an allocation data section in the cell allocation notification cell of FIG. 7.

Alternatively, it is also possible to use the allocation data section 801 in a starting cell position indication scheme as shown in FIG. 10, which comprises a starting cell indication section 811 for indicating a starting cell from which the cells are to be consecutively allocated in each upward transmission frame 201, and a number of allocated cells indication section 812 for indicating a number of cells to be consecutively allocated in each upward transmission frame 201 starting from the staring cell.

Figure 11A:
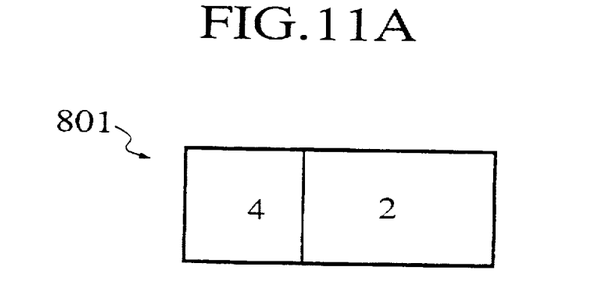
FIGS. 11A and 11B are diagrammatic illustrations of the allocation data section of FIG. 10 and corresponding cells in an upward transmission frame for an exemplary case.
Figure 11B:
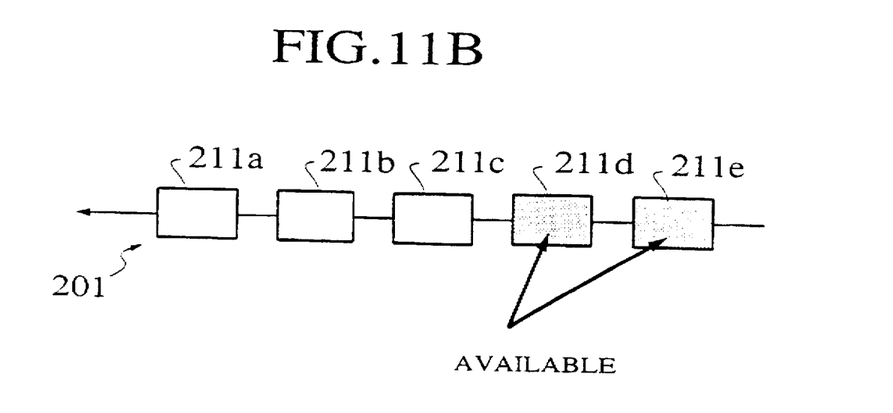

As a concrete example, when the starting cell indication section 811 having a value of "4", and the number of allocated cells indication section 812 having a value of "2" as shown in FIG. 11A are received, it is indicated that, for this communication terminal device, two cells 211d and 211e starting from the fourth cell are available for the communication as shown in FIG. 11B.

Here, the advantages and disadvantages of the above described bit map indication scheme of FIG. 8 and starting cell position indication scheme of FIG. 10 can be relatively evaluated as follows.

Namely, as explained above, the bit map indication scheme indicates the cells that are available for each communication terminal device among numerous cells of each frame by means of a bit pattern using "0" for not available one and "1" for available one, whereas the starting cell position indication scheme indicates a number of consecutive cells that are available for each communication terminal device along with the starting cell among the numerous cells of each frame.

As a consequence, the bit map indication scheme has an advantage that it can specify arbitrary set of cells within each frame, while the starting cell position indication scheme can specify only the consecutive cells. On the other hand, the bit map indication scheme requires as many bits for indicating the cell allocation as a number of cells in each frame, while the starting cell position indication scheme has an advantage that it requires only as many bits as necessary for specifying a starting cell ID and a number of consecutive cells to be allocated.

These advantages of disadvantages of each scheme should be taken into consideration along with the practical situation of the system to which the present invention is applied in selecting one of these two schemes, but in general, it can be said that the bit map scheme is more likely a preferable choice in view of the facts that it is preferable to realize an optimal cell allocation frame by frame, and that a number of cells provided in each frame is about 100 to 200 in most cases.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A private communication system, comprising:

a plurality of communication terminal devices for carrying out communications;

a system main device for exchanging communications from the communication terminal devices;

bus type upward and downward digital transmission paths, connecting the system main device and each of the communication terminal devices, for transmitting data in forms of upward and downward transmission frames formed by a plurality of cells in fixed length;

wherein the system main device includes:

means for determining an allocation of idle cells in each upward transmission frame to a communication from each communication terminal device according to a communication request made by said each communication terminal device;

means for transmitting a notification for the allocation determined by the determining means to said each communication terminal device by using an idle cell among the cells in each downward transmission frame, such that said each communication terminal device recognizes allocated cells on the upward digital transmission path available for the communication from said each communication terminal device according to the notification transmitted through the downward digital transmission path; and the determining means also determines a preliminary allocation of idle cells in each upward transmission frame to each communication terminal device which is currently non-communicating, and the transmitting means also transmits a notification for the preliminary allocation determined by the determining means to said each communication terminal device which is currently non-communicating by using an idle cell among the cells in each downward transmission frame, such that said each communication terminal device which is currently non-communicating recognizes preliminarily allocated cells on the upward digital transmission path available for making the communication request from said each communication terminal device according to the notification transmitted through the downward digital transmission path.

2. The system of claim 1, wherein each communication terminal device carries out the communication by using the preliminarily allocated idle cells in each upward transmission frame when a data amount required for the communication is not greater than a data amount transmittable by the preliminarily allocated idle cells.

3. The system of claim 1, wherein each communication terminal device makes the communication request for requesting the allocation of as many cells in each upward transmission frame as required for the communication to the system main device when a data amount required for the communication is greater than a data amount transmittable by the preliminarily allocated idle cells, and carries out the communication by using the allocated cells in each upward transmission frame determined according to the communication request.

4. The system of claim 1, wherein the notification for the allocation is indicated in an allocation data section provided in each cell in each downward transmission frame, said allocation data section having a plurality of cell allocation indication sections in correspondence to the cells in each upward transmission frame for indicating a presence or absence of the allocation for each cell in each upward transmission frame by a bit value of the cell allocation indication section corresponding to said each cell in each upward transmission frame.

5. The system of claim 1, wherein the notification for the allocation is indicated in an allocation data section provided in each cell in each downward transmission frame, said allocation data section having a starting cell indication section for indicating a starting cell from which the idle cells in each upward transmission frame are consecutively allocated, and a number of allocated cells indication section for indicating a number of the idle cells in each upward transmission frame which are consecutively allocated starting from the starting cell.

6. A method of private communication in a private communication system formed by a plurality of communication terminal devices for carrying out communications and a system main device for exchanging communications from the communication terminal devices, the method comprising the steps of:

connecting the system main device and each of the communication terminal devices by bus type upward and downward digital transmission paths for transmitting data in forms of upward and downward transmission frames formed by a plurality of cells in fixed length;

determining an allocation of idle cells in each upward transmission frame to a communication from each communication terminal device at the system main device, according to a communication request made by said each communication terminal device;

transmitting a notification for the allocation determined at the determining step from the system main device to said each communication terminal device by using an idle cell among the cells in each downward transmission frame, such that said each communication terminal device recognizes allocated cells on the upward digital transmission path available for the communication from said each communication terminal device according to the notification transmitted through the downward digital transmission path;

preliminarily determining a preliminary allocation of idle cells in each upward transmission frame to each communication terminal device which is currently non-communicating at the system main device; and transmitting a notification for the preliminary allocation determined by the preliminarily determining step from the system main device to said each communication terminal device which is currently non-communicating by using an idle cell among the cells in each downward transmission frame, such that said each communication terminal device which is currently non-communicating recognizes preliminarily allocated cells on the upward digital transmission path available for making the communication request from said each communication terminal device according to the notification transmitted through the downward digital transmission path.

7. The method of claim 6, wherein each communication terminal device carries out the communication by using the preliminarily allocated idle cells in each upward transmission frame when a data amount required for the communication is not greater than a data amount transmittable by the preliminarily allocated idle cells.

8. The method of claim 6, wherein each communication terminal device makes the communication request for requesting the allocation of as many cells in each upward transmission frame as required for the communication to the system main device when a data amount required for the communication is greater than a data amount transmittable by the preliminarily allocated idle cells, and carries out the communication by using the allocated cells in each upward transmission frame determined according to the communication request.

9. The method of claim 6, wherein the notification for the allocation is indicated in an allocation data section provided in each cell in each downward transmission frame, said allocation data section having a plurality of cell allocation indication sections in correspondence to the cells in each upward transmission frame for indicating a presence or absence of the allocation for each cell in each upward transmission frame by a bit value of the cell allocation indication section corresponding to said each cell in each upward transmission frame.

10. The method of claim 6, wherein the notification for the allocation is indicated in an allocation data section provided in each cell in each downward transmission frame, said allocation data section having a starting cell indication section for indicating a starting cell from which the idle cells in each upward transmission frame are consecutively allocated, and a number of allocated cells indication section for indicating a number of the idle cells in each upward transmission frame which are consecutively allocated starting from the starting cell.

* * * * *